(12) United States Patent
Tsai et al.

(10) Patent No.: US 10,086,559 B2
(45) Date of Patent: Oct. 2, 2018

(54) SYSTEM FOR ONLINE MONITORING POWDER-BASED 3D PRINTING PROCESSES AND METHOD THEREOF

(71) Applicant: NATIONAL APPLIED RESEARCH LABORATORIES, Taipei (TW)

(72) Inventors: Hsin-Yi Tsai, Hsinchu (TW); Min-Wei Hung, Hsinchu (TW); Kuo-Cheng Huang, Hsinchu (TW); Keng-Liang Ou, Kaohsiung (TW); Ching-Ching Yang, Hsinchu (TW)

(73) Assignee: NATIONAL APPLIED RESEARCH LABORATORIES, Taipei (TW)

( * ) Notice: Subject to any disclaimer, the term of this patent is extended or adjusted under 35 U.S.C. 154(b) by 538 days.

(21) Appl. No.: 14/803,679

(22) Filed: Jul. 20, 2015

(65) Prior Publication Data
US 2016/0176114 A1    Jun. 23, 2016

(30) Foreign Application Priority Data
Dec. 17, 2014  (TW) .............................. 103144179 A

(51) Int. Cl.
*B29C 64/386*  (2017.01)
*B33Y 50/02*  (2015.01)

(52) U.S. Cl.
CPC ............ *B29C 64/386* (2017.08); *B33Y 50/02* (2014.12)

(58) Field of Classification Search
None
See application file for complete search history.

(56) References Cited

U.S. PATENT DOCUMENTS

| 8,847,953 | B1 | 9/2014 | Cho et al. | |
| 2004/0173946 | A1* | 9/2004 | Pfeifer | B33Y 10/00 264/497 |
| 2008/0279442 | A1* | 11/2008 | Den Boef | G03F 1/84 382/144 |
| 2015/0165683 | A1* | 6/2015 | Cheverton | B29C 67/0088 382/141 |
| 2016/0046077 | A1* | 2/2016 | Yadroitsau | B29C 67/0077 264/40.1 |

* cited by examiner

Primary Examiner — Kenneth M Lo
Assistant Examiner — Istiaque Ahmed
(74) Attorney, Agent, or Firm — Muncy, Geissler, Olds & Lowe, P.C.

(57) ABSTRACT

A system for online monitoring powder-based 3D printing processes and method thereof are disclosed. A uniform light source having a single wavelength provided by the system is irradiated onto the powder layer before and after applied with glue. Intensities of such reflected images are obtained and subtracted from each other in an image process procedure. A difference obtained through the subtraction is compared with an original 3D model in a computer. If any defect is found such as being larger than a threshold value, the powder-based 3D printing processes will be terminated. Therefore, the technical effects of online printing processes monitoring, time saving and printing resources saving will be achieved.

12 Claims, 5 Drawing Sheets

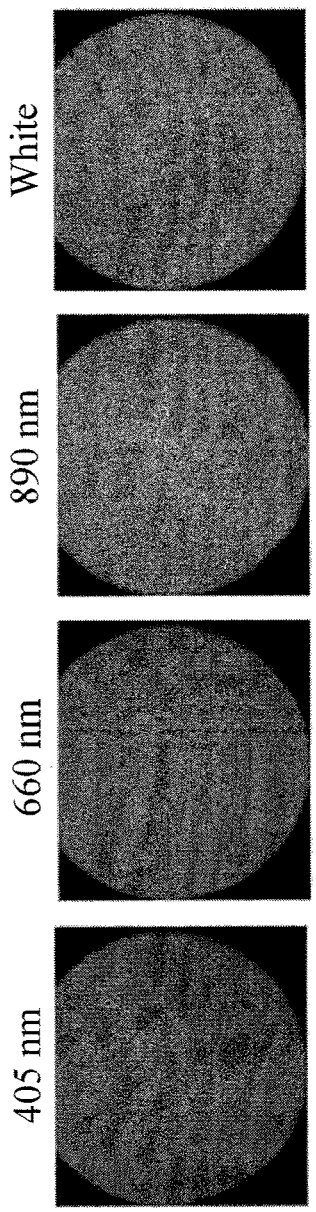
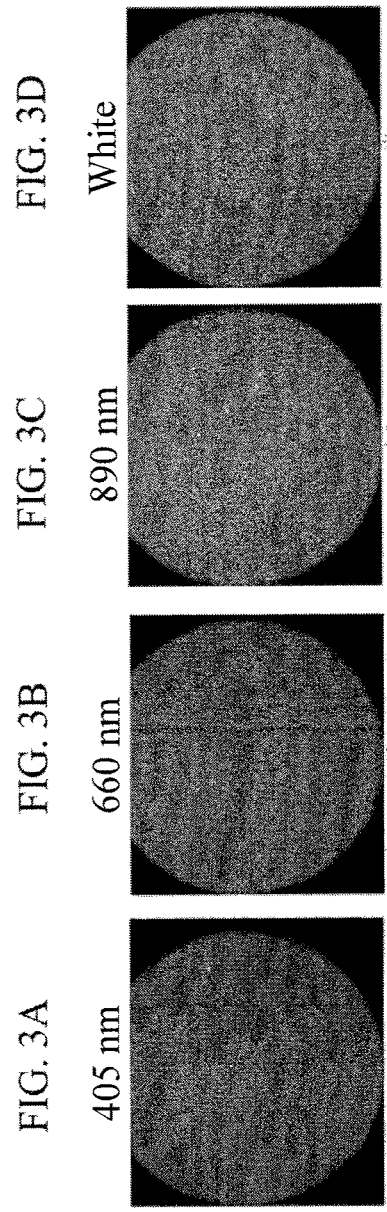

SYSTEM FOR ONLINE MONITORING POWDER-BASED 3D PRINTING PROCESSES AND METHOD THEREOF

CROSS-REFERENCE TO RELATED APPLICATION

This application claims priority from Taiwan Patent Application No. 103144179, filed on Dec. 17, 2014, in the Taiwan Intellectual Property Office, the content of which are hereby incorporated by reference in their entirety for all purposes.

BACKGROUND OF THE INVENTION

1. Field of the Invention

The present invention relates to a system for online monitoring powder-based 3D printing processes and method thereof, in particular to a system for online monitoring through acquiring a contour of pattern in real time before and after printing and confirming a result of layer by layer comparing with a 3D model of computer and method thereof.

2. Description of the Related Art

With the rapid development of the printing technology associated with computer, 3D printing technology has started its evolution in the computer industry, and the technology of the powder-based 3D printing is one of the most popular in the 3D printing technology.

The technology of the powder-based 3D printing includes finishing the drawing of the 3D models which are prepared to be printed first on the computer, then performing layer by layer powder bed printing on a flat plate by a powder-based 3D printing device according to the 3D models, and finally generating a 3D object which is same as the 3D models on the computer. The method for the so-called layer by layer powder bed printing is to preset the printing settings corresponding to each layer of pattern in the 3D models of computer. Then, the powder-based 3D printing device performs the printing of the layer according to the printing settings of each layer. In general, the paving of the powder is performed first. Glue is then applied on the powder layer. The powder applied with glue will be gradually solidified to generate the desired contour of pattern. The final desired 3D object may be generated via powder bed printing layer by layer.

Theoretically, the powder paved by the powder-based 3D printing device should be flat and the glue applied should be even. However, because of the low precision of the elements and the components of the powder-based 3D printing device and the poor application technology, the paving of the powder readily causes roughness and the application of glue readily causes unevenness. This situation will also lead to the problem of the contour defects appearing on the contour of pattern (i.e. irregularities appearing on the contour), which results in the differences between the final print out of the 3D object and the 3D models on the computer. The U.S. Pat. No. 8,847,953, is a technical scheme which proposes how to perform the comparison of the differences between the 3D object and the 3D models on the computer after the printing is completed.

However, the powder-based 3D printing always takes considerable time, and the cost of the materials used such as powder and glue powder is not low. Thus, if the comparison of the differences is performed after the printing process is completed, much time will be wasted and a lot of printing resources will be consumed. Therefore, a monitoring mechanism with real-time performance for powder-based 3D printing is essential indeed.

SUMMARY OF THE INVENTION

In view of the previous conventional technique cannot meet the actual demand but with room for improvement, the present invention thus provides a system for online monitoring powder-based 3D printing processes and method thereof, in particular to a system for online monitoring through acquiring a contour of pattern in real time and confirming a result of layer by layer printing after comparing with a 3D model of computer and method thereof.

The present invention provides a method for online monitoring powder-based 3D printing processes, which is an online monitoring performed when a powder bed is printed layer by layer based on a 3D model on a computer. The method at least includes the following steps: (a) when the computer replies that a paving of a powder layer of the powder bed is completed, the powder bed is irradiated by a uniform light having a single wavelength to acquire a first reflected image and corresponding first light intensity information; (b) after the computer replies that the powder layer of the powder bed is applied with glue, the powder bed is again irradiated by the uniform light having the single wavelength to acquire a second reflected image and corresponding second light intensity information; (c) performing an image processing to the first and second light intensity information to obtain a contour of pattern; (d) comparing the contour of pattern with the 3D model to perform image comparison and determine whether a contour defect is caused; (e) when the contour defect is not caused, the computer is informed for printing; (f) when the computer replies that the printing is not yet completed and the paving of a new powder layer of the powder bed is completed, step (a) to step (f) are repeated; and (g) when the computer replies that the printing is completed, the online monitoring is terminated.

In an embodiment of the method of the present invention, the method for online monitoring powder-based 3D printing further includes that, when the contour defect is caused, the computer is informed immediately to stop printing and terminate the online monitoring.

In another embodiment of the method of the present invention, the method for online monitoring powder-based 3D printing further includes that, when the contour defect is caused, it is further determined whether the contour defect exceeds a preset ratio. When the contour defect does not exceed the ratio, the computer is informed for printing and goes to the step (f). On the contrary, when the contour defect exceeds the ratio, the computer is informed to stop printing and terminate the online monitoring.

The present invention provides a system for online monitoring powder-based 3D printing processes, which performs an online monitoring when a powder bed is printed layer by layer based on a 3D model on a computer, including: (a) a light supplying module, used for controlling a light controller, when the computer replies that a paving of a powder layer of the powder bed is completed, at least one light source actuated by the light controller to irradiate a uniform light having a single wavelength on the powder bed, and after the computer replies that the powder layer of the powder bed is applied with glue, at least one light source described again actuated by the light controller to irradiate the uniform light having a single wavelength on the powder bed again; (b) an image acquiring module, used for controlling an image acquiring device, when the computer replies that the paving of the powder layer of the powder bed is completed and the light supplying module is actuated, a first reflected image is acquired, and after the computer replies that the powder layer of the powder bed is applied with glue and the light supplying module is actuated, a second reflected image is acquired; (c) a contour determining module, used for obtaining the first reflected image and the second reflected image from the image acquiring module, getting first light intensity information and second light intensity information respectively to perform an image processing in order to obtain a contour of pattern, and performing image comparison between the contour of pattern and the 3D model to determine whether a contour defect is caused; and (d) a printer monitoring module, used for informing the computer to print when the contour determining module determines that the contour defect is not caused, and terminating the online monitoring when the computer replies that the printing is completed.

In an embodiment of the system of the present invention, the printer monitoring module of the present invention further includes that, when the contour defect is caused, the computer is informed immediately to stop printing and terminate the online monitoring.

In another embodiment of the system of the present invention, the contour determining module further includes, when the contour defect is caused, the contour determining module further determines whether the contour defect exceeds a preset ratio. At this moment, when the contour defect does not exceed the ratio, the printer monitoring module informs the computer for printing. On the contrary, when the contour defect exceeds the ratio, the computer is informed to stop printing and terminate the online monitoring.

In the method and the system of the present invention, in order to obtain obvious light intensity information, the light used is the LED with wavelength ranged from 405 nm to 660 nm or ultraviolet light.

The technical effects of online monitoring, avoiding wasting time and consuming printing resources can be actually achieved through the system and the method for online monitoring powder-based 3D printing processes of the present invention.

BRIEF DESCRIPTION OF THE DRAWINGS

FIG. 3(A) to FIG. 3(D) are reflected images obtained through performing irradiation to the powder bed by use of light sources with different wavelengths before the powder bed is applied with glue in the present invention.

FIG. 3(E) to FIG. 3(H) are reflected images obtained through performing irradiation to the powder bed by using light sources with different wavelengths corresponding to FIG. 3(A) to FIG. 3(D) after the powder bed is applied with glue in the present invention.

DETAILED DESCRIPTION OF THE PREFERRED EMBODIMENTS

The features and the methods of implementation of the present invention will be illustrated below in detail in accordance with the accompanying drawings and embodiments. The contents of disclosure is sufficient to enable any person skilled in the relevant art to easily and fully understand the technical means of the present invention applied to solve the technical problem and implement accordingly. Thereby, the achievable effects of the prevent invention are realized.

Figure 1:
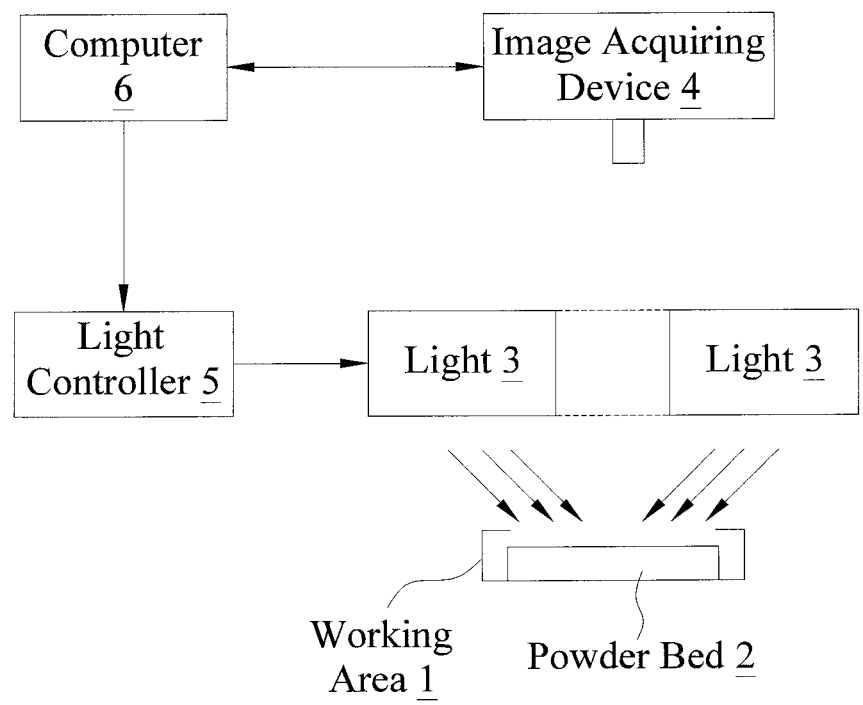
FIG. 1 is a schematic view of operation of the system for online monitoring powder-based 3D printing processes of the present invention.

The present invention provides a system for online monitoring powder-based 3D printing processes and method thereof. FIG. 1 is a schematic view of operation of the system for online monitoring powder-based 3D printing processes of the present invention. The following contents will be further illustrated in accordance with this figure.

The system for online monitoring powder-based 3D printing processes of the present invention performs an online monitoring when a powder bed is printed layer by layer based on a 3D model on a computer 6. The computer 6 usually has built up the 3D models of 3D objects required to be printed (i.e., graphic documents) in advance, and then connects to the so-called powder-based 3D printing device (not shown in the figure) to start the layer by layer printing process. As the printing process performed, the powder-based 3D printing device will gradually produce a powder bed 2 of 3D object within the scope of the specified working area 1.

Because of the low precision of the elements and the components of the powder-based 3D printing device and the poor application technology, the paving of the powder readily causes roughness and the application of glue readily cause unevenness. This situation will also lead to the problem of the contour defects appearing on the contour of pattern printed by the powder-based 3D printing device (i.e. irregularities appearing on the contour). Therefore, in order to monitor this problem, at least one light source 3 is added above the working area 1 described of the present invention and the switch-on and off of the light source 3 are controlled by a light controller 5. The light source 3 must be set up to be able to provide a light which may irradiate on the surface of the powder bed 2 uniformly as an assumption (e.g. forming an annular light source), and the light provided by the light source 3 must be a light having a single wavelength. Furthermore, the present invention is added with an image acquiring device 4 (e.g. CCD photographing device) at the upper position of the powder bed 2 in the working area 1 to acquire the image of the powder bed 2. The position of set-up must not affect the uniform irradiation of the light source 3 described above and the position of the light source 3 also must not affect the image acquiring device 4 to acquire images as shown in FIG. 1.

Figure 2:
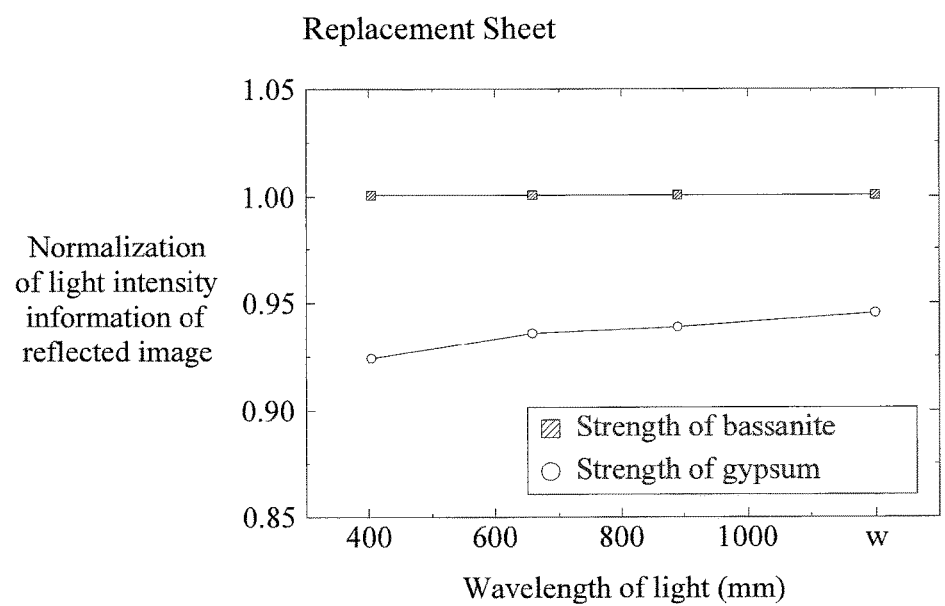
FIG. 2 is a diagram of light intensity information vs. wavelengths of light obtained by performing irradiation to the powder layer of the powder bed using light sources with different wavelengths.

FIG. 2 is a diagram of light intensity information vs. wavelengths of light of the present invention obtained by performing irradiation to the powder layer of the powder bed 2 using light sources with different wavelengths. In general, bassanite is used as the powder paved during powder-based 3D printing. The bassanite will gradually condense to gypsum after applied with glue. In FIG. 2, the upper dotted line is the light intensity (i.e. the light intensity information) of the reflected images detected after the powder layers of the powder bed 2 paved by the bassanite are irradiated by the light with different wavelengths respectively and before applied with glue. The lower dotted line is the light intensity (i.e. the light intensity information) of the reflected images of the reflected light detected through the powder layers of the powder bed 2 irradiated by the light with different wavelengths after applied with glue. As one may know from the figure, the light intensity difference of the reflected image between both bassanite (before the application of glue) and gypsum (after the application of glue) is more significant in the light with wavelengths ranged from 405 nm to 660 nm, in which 405 nm (e.g. ultraviolet light) is the most significant. Therefore, the light source used in the present invention is light source 3 (i.e. ultraviolet light) with 405 nm, but the present invention is not limited thereto.

The light intensity difference produced by the reflected image between both bassanite (before the application of glue) and gypsum (after the application of glue) irradiated by the light with different wavelengths may be further referred to FIG. 3. FIG. 3(A) to FIG. 3(D) are reflected images obtained through performing irradiation to the powder of bassanite on the powder bed 2 by use of light sources with different wavelengths (405 nm, 660 nm, 890 nm and white light respectively) before the powder bed 2 is applied with glue in the present invention. FIG. 3(E) to FIG. 3(H) are reflected images obtained through performing irradiation to the gypsum on the powder bed 2 by use of light sources with different wavelengths corresponding to FIG. 3(A) to FIG. 3(D) after the powder bed 2 is applied with glue in the present invention. As one may see from the figure, under the irradiation of the light with 405 nm, the difference of the light intensity of the reflected light between both FIG. 3(A) and FIG. 3(E) presented in the procedures of image processing will be the most significant.

Figure 4:
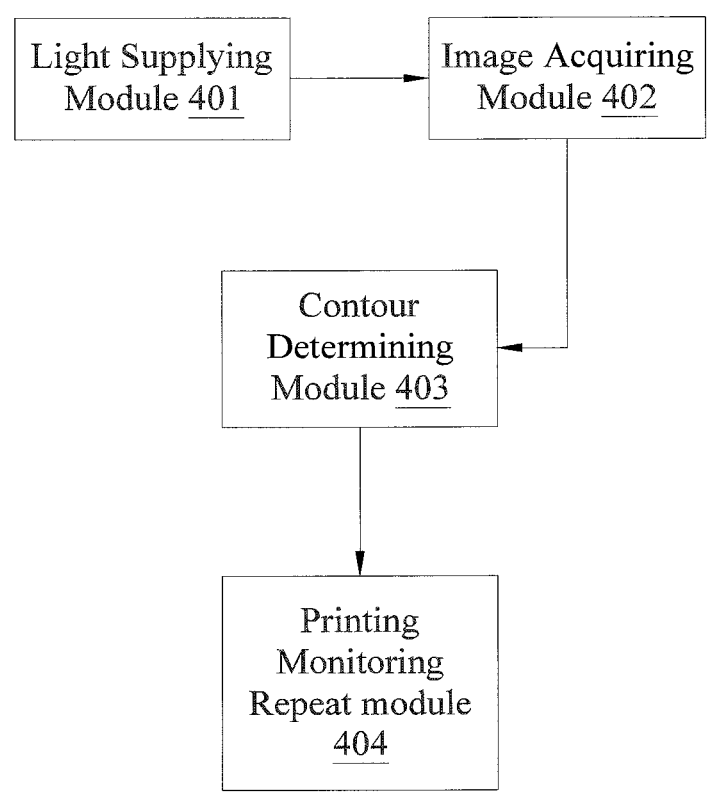
FIG. 4 is a block diagram of the control software of the system for online monitoring powder-based 3D printing processes of the present invention.

Please refer to FIG. 1, for the purpose of online monitoring, the system for online monitoring powder-based 3D printing processes of the present invention includes a control software to control the image acquiring device 4 for acquiring images, the light controller for switching on and off the light source 3, as well as to perform the comparison of image contour and the control of printing process in order to achieve the purpose of online monitoring. This control software includes at least several modules; please also refer to FIG. 4.

A light supplying module 401 is used for controlling the light controller 5. When the computer 6 replies that a paving of a powder layer of the powder bed 2 is completed, the light source 3 described is actuated to irradiate a uniform light having a single wavelength on the powder bed 2. And after the computer 6 replies that the powder layer of the powder bed is applied with glue, the light source 3 described is again actuated to irradiate the uniform light having a single wavelength on the powder bed again.

An image acquiring module 402 is used for controlling an image acquiring device 4. When the computer 6 replies that the paving of the powder layer of the powder bed is completed and the light supplying module 401 is actuated, a first reflected image is acquired. And after the computer 6 replies that the powder layer of the powder bed is applied with glue and the light supplying module 401 is actuated, a second reflected image is acquired.

A contour determining module 403 is used for obtaining the first reflected image and the second reflected image from the image acquiring module 402, getting and analyzing first light intensity information and second light intensity information from images respectively to perform an image processing in order to obtain a contour of pattern, and performing image comparison between the contour of pattern and the 3D model to determine whether a contour defect is caused.

The image processing described above refers to generate the contour of pattern drawn by use of a light intensity difference obtained between both the first light intensity information corresponding to the first reflected image and the second light intensity information corresponding to the second reflected image after subtraction.

The so-called contour defects are defined by determining whether the case of protrusion or recession happens on the contour of the printed layer through performing image comparison analysis between the contour of pattern and the 3D models. Under much strict requirements and conditions, as long as the present invention determines that the contour defect is found, the printing may be immediately stopped. In another embodiment, the present invention may preset a ratio (i.e. the ratio of contour defect), which generally refers to a ratio of area between the contour of pattern and a protrusion and/or a recession of the contour of 3D model. When it is determined that the contour defect exceeds the ratio, the printing is then immediately stopped. In general, the ratio of contour defect may be set from 10% to 30%. In other words, when the ratio of area of the protrusion and/or the recession of the contour exceeds 10% to 30% of the original area of the 3D model, the printing process will be stopped in order to reduce time and printing resources to be kept consuming It should be understood that, the ratio of contour defect described is not particularly limited, a flexible setting may be given depending on different conditions and demands of the practical online monitoring.

The comparison of the ratio described may be made based on a single result of calculation or an accumulated statistical result. In other words, the present invention may base on whether a single contour defect caused during printing a single-layer of powder bed 2 exceeds the ratio to decide whether to stop printing, and may also base on whether the accumulated statistical result of the contour defect individually caused by a multilayer of powder bed 2 exceeds the ratio to decide whether to stop printing. In the practical implementation, the flexibility of application of the present invention may be increased by setting based on different conditions and demands of the online monitoring performed by the system.

A printer monitoring module 404 is used for informing the computer 6 to print when the contour determining module 403 determines that the contour defect is not caused, or when the contour defect does not exceed the preset ratio in another embodiment, and terminating the online monitoring when the computer 6 replies that the printing is completed. On the contrary, when the contour determining module 403 determines that the contour defect is caused, or when the contour determining module 403 determines that the contour defect exceeds the ratio in another embodiment, the printer monitoring module 404 informs the computer 6 to stop printing and terminate the online monitoring.

It should be understood that, the control software in the system of the present invention may be applied to the computer 6 to control different module. The function of each module may also be developed independently as software/firmware installed/embedded in different devices respectively in accordance with the different demands for development of the system, such as: the light supplying module 401 may be applied to the light controller 5, the image acquiring module 402 may be applied to the image acquiring device 4. Or according to the consideration of the required operation resources, the module operating with more operation resources, such as contour determining module 403 may be applied to the computer 6 which has a greater amount of operation resources, such that the operation efficiency can be enhanced during the operation of the system of the present invention.

Figure 5:
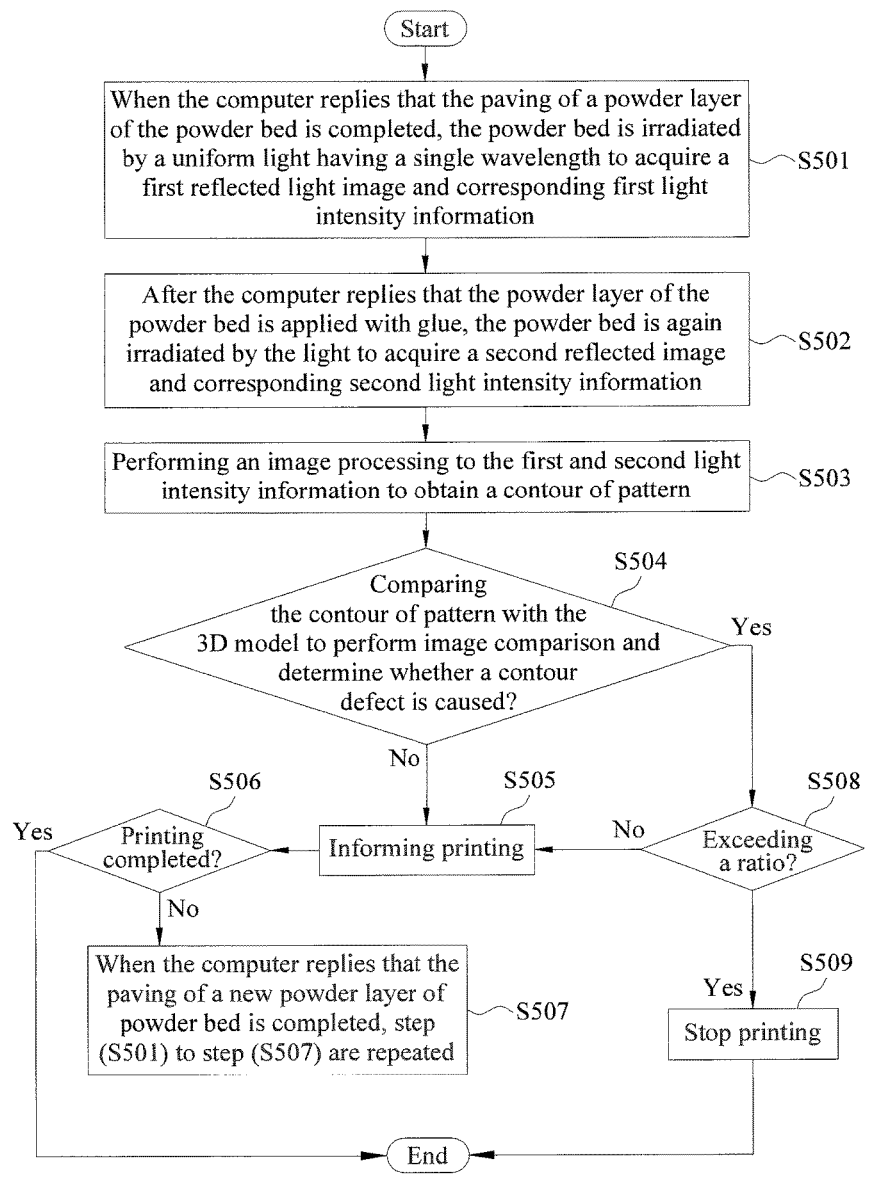
FIG. 5 is a flow chart of the method for online monitoring powder-based 3D printing processes of the present invention.

FIG. 5 is a flow chart of the method for online monitoring powder-based 3D printing processes of the present invention. The workflow thereof is illustrated as follows:

After the computer 6 actuates the printing process, the computer 6 starts performing the paving of the powder layer in the working area 1. When the computer 6 replies that the paving of the powder layer of the powder bed is completed, the present invention then irradiates a uniform light having a single wavelength on the powder bed 2 to acquire a first reflected image and the corresponding first light intensity information (step S501). After step S501 is completed, the computer 6 is informed to continue performing the printing process. At this moment, the computer 6 will perform application of glue to the powder layer just paved. After the computer 6 replies that the powder layer of the powder bed is applied with glue, the present invention then irradiates the uniform light having a single wavelength on the powder bed 2 again to acquire a second reflected image and the corresponding second light intensity information (step S502). After the first light intensity information and the second light intensity information are obtained, the procedures of performing image processing are then actuated to obtain a contour of pattern (step S503). Then, the contour of pattern is compared with the 3D models to perform image comparison and determine whether a contour defect is caused (step S504). If the contour defect is not caused, the computer 6 is informed to continue performing the successive printing process (step S505). At this moment, the computer 6 will determine whether the printing is already completed (step S506). When the workflow proceeds to step (S507), the present invention will continue performing the online monitoring if the computer 6 replies that the printing is not completed, The present invention will continue repeating step (S501) to step (S507) until the computer 6 again replies that the printing of a new layer of powder layer of the powder bed 2 is completed.

During step (S504), the present invention may immediately inform the computer 6 to stop printing and terminate the online monitoring (not shown in the figure) once a contour defect caused is found. Or in another embodiment, when it is determined that the contour defect caused exceeds the preset ratio (step S508), the computer 6 is informed to stop printing (step S509) and terminate the online monitoring.

Although the method of implementation of the present invention is disclosed as above, the content descripted is not intended to directly limit the scope of claims of the present invention. Some changes and modifications made to the form and details of the implementation of the present invention without departing from the spirit and scope disclosed by the present invention as assumption by any skills in the art relevant to the present invention are within the scope of claims of the present invention. The scope of claims of the present invention should still be referred to the one defined by the appended claims of application as a standard.

What is claimed is:

1. A method for online monitoring powder-based 3D printing processes, being an online monitoring performed when a powder bed is printed layer by layer based on a 3D model on a computer, the method at least comprising the following steps:

(a) when the computer replies that a paving of a powder layer of the powder bed is completed, the powder bed irradiated by a uniform light having a single wavelength to acquire a first reflected image and corresponding first light intensity information;

(b) after the computer replies that the powder layer of the powder bed is applied with glue, the powder bed again irradiated by the light to acquire a second reflected image and corresponding second light intensity information;

(c) performing an image processing to the first and second light intensity information to obtain a contour of pattern;

(d) comparing the contour of pattern with the 3D model and determine whether a contour defect is caused;

(e) when the contour defect is not caused, the computer informed for printing;

(f) when the computer replies that the printing is not yet completed and the paving of a new powder layer of the powder bed is completed, step (a) to step (f) repeated;

(g) when the computer replies that the printing is completed, the online monitoring is terminated; and (h) when the contour defect is caused whether the contour defect exceeds a preset ratio, the printing is stopped and the online monitoring is terminated, the preset ratio of contour defect is set from 10% to 30%.

2. The method for online monitoring powder-based 3D printing processes of claim 1, wherein the preset ratio refers to a ratio of area of the contour of pattern compared to a protrusion and/or a recession of the contour of 3D model.

3. The method for online monitoring powder-based 3D printing processes of claim 1, wherein the image processing generates the contour of pattern through a light intensity difference between both the first light intensity information corresponding to the first reflected image and the second light intensity information corresponding to the second reflected image after subtraction.

4. The method for online monitoring powder-based 3D printing processes of claim 1, wherein the light is the LED with a wavelength ranged from 405 nm to 660 nm.

5. The method for online monitoring powder-based 3D printing processes of claim 1, wherein the light is ultraviolet light.

6. A system for online monitoring powder-based 3D printing processes, performing an online monitoring when a powder bed is printed layer by layer based on a 3D model on a computer, the system at least comprising:

a light controller to switch on or off a light source, when the computer replies that a paving of a powder layer of the powder bed is completed, the light source is switched on by the light controller to irradiate a uniform light having a single wavelength on the powder bed, and after the computer replies that the powder layer of the powder bed is applied with glue, the light source is switched on by the light controller to irradiate the light on the powder bed again;

an image acquiring device, when the computer replies that the paving of the powder layer of the powder bed is completed and the light controller is actuated to switch on the light source, a first reflected image is acquired, and after the computer replies that the powder layer of the powder bed is applied with glue and the light controller is actuated to switch on the light source, a second reflected image is acquired; and the computer, coupling to the light controller and the image acquiring device, and obtaining the first reflected image and the second reflected image from the image acquiring device, getting first light intensity information and second light intensity information respectively to obtain a contour of pattern, and performing image comparison between the contour of pattern and the 3D model to determine whether a contour defect is caused;

when the computer determines that the contour defect is caused, and the contour defect exceeds a preset ratio the printing is stopped and the online monitoring is terminated, the preset ratio of contour defect is set from 10% to 30%; and when the computer determines that the contour defect is not caused and the printing is completed, the online monitoring is terminated.

7. The system for online monitoring powder-based 3D printing processes of claim 6, when the contour defect is caused, the computer is informed to stop printing and terminate the online monitoring.

8. The system for online monitoring powder-based 3D printing processes of claim 6, when the contour defect does not exceed the preset ratio, the computer is informed for printing.

9. The system for online monitoring powder-based 3D printing processes of claim 6, wherein the preset ratio refers to a ratio of area of the contour of pattern compared to a protrusion and/ or a recession of the contour of 3D model.

10. The system for online monitoring powder-based 3D printing processes of claim 6, wherein the image processing generates the contour of pattern through a light intensity difference between both the first light intensity information corresponding to the first reflected image and the second light intensity information corresponding to the second reflected image after subtraction.

11. The system for online monitoring powder-based 3D printing processes of claim 6, wherein the light is the LED with a wavelength ranged from 405 nm to 660 nm.

12. The system for online monitoring powder-based 3D printing processes of claim 6, wherein the light is ultraviolet light.

* * * * *